(12) United States Patent
Lee (10) Patent No.: US 9,580,053 B2
(45) Date of Patent: Feb. 28, 2017

(54) SIGNAL PROCESSING APPARATUS FOR WHEEL SPEED SENSOR

(71) Applicant: MANDO CORPORATION, Pyeongtaek-si, Gyeonggi-do (KR)

(72) Inventor: Chang Woo Lee, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/688,792

(22) Filed: Apr. 16, 2015

(65) Prior Publication Data

US 2015/0298672 A1    Oct. 22, 2015

(30) Foreign Application Priority Data

Apr. 16, 2014  (KR) .................. 10-2014-0045332

(51) Int. Cl.
*B60T 8/88* (2006.01)
*B60T 8/171* (2006.01)
*H02H 3/08* (2006.01)

(52) U.S. Cl.
CPC .............. *B60T 8/885* (2013.01); *B60T 8/171* (2013.01); *B60T 2270/413* (2013.01); *B60T 2270/416* (2013.01)

(58) Field of Classification Search
CPC . B60T 8/885; H02H 3/08; H02H 9/02; H02H 3/00

USPC ..................................... 701/29.7, 29.8, 30.3
See application file for complete search history.

(56) References Cited

U.S. PATENT DOCUMENTS

| 6,297,673 | B1 * | 10/2001 | Walther | ................. B60T 8/171 327/103 |
| 9,068,859 | B2 * | 6/2015 | Dwyer | ................... G01D 5/145 |
| 2010/0182725 | A1 * | 7/2010 | Trapp | ..................... B60T 8/885 361/93.1 |

FOREIGN PATENT DOCUMENTS

| DE | 19635440 A1 | 3/1998 |
| DE | 102005006151 A1 | 8/2005 |
| DE | 102006037619 A1 | 3/2007 |

* cited by examiner

*Primary Examiner* — Tan Q Nguyen
(74) *Attorney, Agent, or Firm* — McDermott Will & Emery LLP (57) ABSTRACT

Disclosed herein is a signal processing apparatus for a wheel speed sensor, which monitors a current input to a wheel speed sensor so as to prevent the current from being excessively supplied to the wheel speed sensor. That is, the present disclosure relates to the signal processing apparatus for a wheel speed sensor, which monitors the current input to the wheel speed sensor in a duplex manner. The signal processing apparatus for a wheel speed sensor include a sensor input terminal unit to which a sensing signal of a wheel speed sensor is input, and a normality determination block determining whether or not the sensing signal is normal.

11 Claims, 4 Drawing Sheets

(a) WHEN PERIOD IS SHORT (HIGH SPEED)

(b) WHEN PERIOD IS LONG (LOW SPEED)

SIGNAL PROCESSING APPARATUS FOR WHEEL SPEED SENSOR

CROSS-REFERENCE(S) TO RELATED APPLICATIONS

This application claims priority to Korean Patent Application No. 10-2014-0045332 filed on Apr. 16, 2014 the disclosure of which is incorporated herein by reference in its entirety.

BACKGROUND OF THE INVENTION

Field of the Invention

Exemplary embodiments of the present invention relate to a signal processing apparatus for a wheel speed sensor, and more particularly, to a signal processing apparatus for a wheel speed sensor, which monitors a current input to a wheel speed sensor so as to prevent the current from being excessively supplied to the wheel speed sensor. That is, the exemplary embodiments of the present invention relate to the signal processing apparatus for a wheel speed sensor, capable of monitoring the current input to the wheel speed sensor in a duplex manner.

Description of the Related Art

In recent years, an example of mounting an anti-lock brake system to a vehicle increases rapidly. This is to previously prevent accidents by preventing loss of steering force or rotation of the vehicle caused by fixing of wheels when the vehicle is rapidly braked in the event of danger during traveling and by preventing sliding of the vehicle caused by fixing of the wheels when the vehicle is braked on an icy road.

The above anti-lock brake system provides stable braking force for the vehicle, which is rapidly braked or travels on the unstable road such as a snowy road or a rainy road, since an electronic control unit of the anti-lock brake system repeatedly controls locking and unlocking between a brake pad and a brake disk according to wheel rotation speed of the vehicle. Therefore, it is necessary to accurately detect the wheel rotation speed, and to detect whether or not a wheel speed sensor fails so as to properly control the wheel rotation speed in response to the detected result.

That is, a study has been carried out since the wheel speed sensor is required to have an accurate operation and it is necessary to monitor whether or not the wheel speed sensor is abnormally operated, in order for the vehicle to safely travel in a recent vehicle environment.

For example, Korean Patent Laid-open Publication No. 10-2009-0078401 discloses a technique in which a circuit of monitoring a current input to a wheel speed sensor is eliminated by preventing the current from being excessively supplied to the wheel speed sensor using a current mirror.

However, there is a concern about safety since it is not determined whether or not the wheel speed sensor and the circuit of monitoring the current input thereto fail in the above Patent Document.

RELATED ART DOCUMENT

[Patent Document] Korean Patent Laid-open Publication No. 10-2009-0078401 (Jul. 20, 2009)

SUMMARY OF THE INVENTION

An object of the present invention is to provide a signal processing apparatus for a wheel speed sensor, capable of monitoring a current input to a wheel speed sensor so as to prevent the current from being excessively supplied to the wheel speed sensor.

Another object of the present invention is to provide a signal processing apparatus for a wheel speed sensor, capable of monitoring whether or not a wheel speed sensor is abnormally operated in real time and simultaneously identifying whether or not a monitoring circuit is abnormally operated, by monitoring a current input to the wheel speed sensor in a duplex manner.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a signal processing apparatus for a wheel speed sensor includes a sensor input terminal unit to which a sensing signal of a wheel speed sensor is input, and a normality determination block determining whether or not the sensing signal is normal.

The sensor input terminal unit may protect a circuit therein by detecting that the wheel speed sensor is erroneously connected to a battery.

The sensor input terminal unit may protect a circuit therein by detecting that the wheel speed sensor is erroneously connected to a ground portion.

The sensor input terminal unit may protect a circuit therein by detecting that an overcurrent flows to the wheel speed sensor.

The sensor input terminal unit may detect that connection of the wheel speed sensor is opened and transmit open information to the normality determination block such that the normality determination block is not erroneously operated.

The normality determination block may include a sensing signal processing section which outputs the sensing signal to an external MCU.

The normality determination block may identify whether the sensing signal satisfies a predetermined upper limit current value and a predetermined lower limit current value.

The normality determination block may further include a sensing signal processing section which has a falling/rising timing similar to the sensing signal and outputs a sensing voltage signal copied as a voltage signal having a high/low level required by an external MCU.

The normality determination block may include an ADC for converting the sensing signal transmitted from the sensor input terminal unit into an analog-digital signal, and a normality determination section for analyzing result values of the ADC to determine a normal status thereof.

The ADC may include a signal selection section which has a GIST (Built In Self Test) signal input terminal for instructing a BIST and at least one bandgap input terminal, and an analog-digital conversion block which outputs a comparison result of levels of a predetermined reference threshold voltage and a voltage applied by the signal selection section as a binary value.

The normality determination section may include an edge determination section which determines a rising edge and a falling edge, a comparison section which compares a high level range and a low level range, and a range monitoring section which monitors whether or not at least a level of the edge determination section and the comparison section is in a range between upper and lower limit values.

The normality determination block may include an edge counter which determines and counts a rising edge and/or a falling edge of the sensing signal, a data identification section which identifies a falling pattern and a rising pattern of the sensing signal, and a comparison determination processing section which compares the number of counted edges output from the edge counter and the number of patterns output from the data identification section and determines a normal/abnormal status thereof.

The normality determination block may determine a difference between a level detection time of a rising edge or a falling edge and a level detection time after detection of the rising edge or falling edge using at least one of a fixed timing synchronization algorithm, an adaptive timing synchronization algorithm, and a timing tracking circuit.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Exemplary embodiments of the present invention will be described below in more detail with reference to the accompanying drawings.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Therefore, it should be understood that the scope and spirit of the present invention can be extended to all variations, equivalents, and replacements in addition to the appended drawings of the present invention.

A signal processing apparatus for a wheel speed sensor according to exemplary embodiments of the present invention will be described below in more detail with reference to the accompanying drawings.

Figure 1:
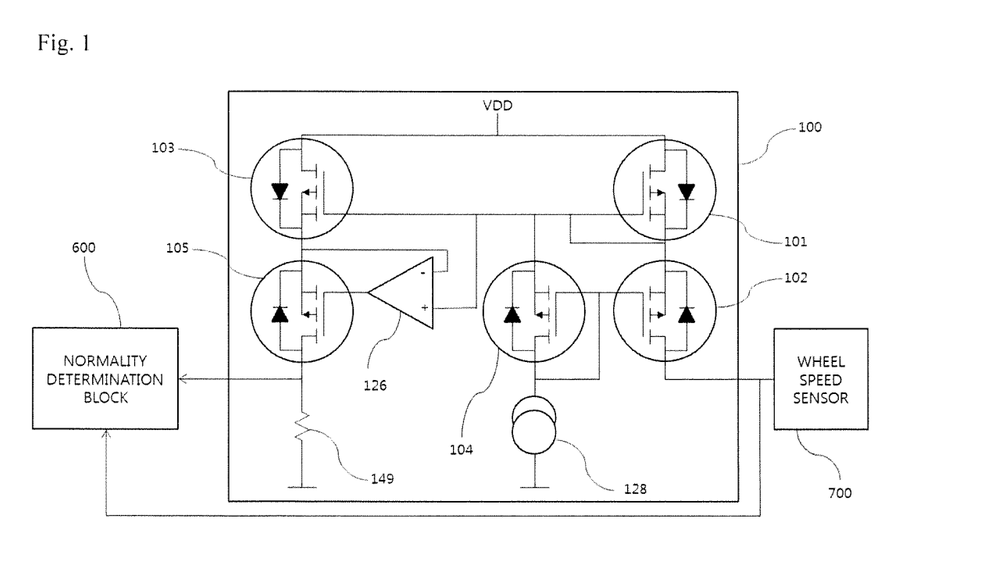
FIG. 1 is a circuit diagram illustrating a signal processing apparatus for a wheel speed sensor according to an embodiment of the present invention.

FIG. 1 is a circuit diagram illustrating a signal processing apparatus for a wheel speed sensor according to an embodiment of the present invention. FIGS. 2 to 7 are diagrams for explaining FIG. 1 in detail.

Hereinafter, the signal processing apparatus for a wheel speed sensor according to the embodiment of the present invention will be described with reference to the accompanying drawings.

First, referring to FIG. 1, the signal processing apparatus for a wheel speed sensor according to the embodiment of the present invention may include a sensor input terminal unit 100 to which a sensing signal of a wheel speed sensor 700 is input and a normality determination block 600 which determines whether or not the sensing signal is normal.

Here, the sensor input terminal unit 100 may protect a circuit therein by detecting that the wheel speed sensor 700 is erroneously connected to a battery.

The sensor input terminal unit 100 may protect the circuit therein by detecting that the wheel speed sensor 700 is erroneously connected to a ground portion.

The sensor input terminal unit 100 may protect the circuit therein by detecting that an overcurrent flows to the wheel speed sensor 700.

The sensor input terminal unit 100 may detect that connection of the wheel speed sensor 700 is opened and transmit open information to the normality determination block 600 such that the normality determination block 600 is not erroneously operated.

That is, the sensing signal of the wheel speed sensor 700 may be converted into a signal capable of being determined by the normality determination block 600 through a predetermined circuit in the sensor input terminal unit 100.

The sensor input terminal unit 100 may be configured by five MOS transistors, an OP amplifier 126, and a current limiting section 128. Here, a current flowing through a first MOS transistor 101 and a second MOS transistor 102 may be equal to the current flowing to the wheel speed sensor 700, and the current may be limited through a fourth MOS transistor 104 and the current limiting section 128.

A current flowing through the first MOS transistor 101 and a third MOS transistor 103 may be amplified or attenuated through the OP amplifier 126 and be stably supplied to the normality determination block 600 to a proper level so as to be received by the normality determination block 600.

Meanwhile, the normality determination block 600 may directly receive a current from the wheel speed sensor 700 or may also receive the current through the sensor input terminal unit 100.

Accordingly, the normality determination block 600 may also determine whether or not the sensor input terminal unit 100 fails by directly receiving the signal of the wheel speed sensor 700.

The wheel speed sensor 700 attached to a wheel or an axle of a vehicle may repeatedly sense a predetermined reference point indicated on the wheel or the axle according to rotation of the wheel, and may define a path through which a high or low current flows according to the sensing status of the reference point. In general, a 7 mA current as low current and a 14 mA current as high current flow through the wheel speed sensor 700 used for the vehicle.

A current as a sensing signal flowing via the first and second MOS transistors 101 and 102 may be mirrored by the illustrated third and fourth MOS transistors 103 and 104. A current mirrored by a current mirror configured of the first and third MOS transistors 101 and 103 may flow to a resistance 149 via the third MOS transistor 103 and a fifth MOS transistor 105 so as to generate a voltage signal applied to a sensing signal processing section 147.

A current mirrored by a current mirror configured of the second and fourth MOS transistors 102 and 104 flows via the fourth MOS transistor 104 and the current limiting section 128, but no current flows over a predetermined limit value by the current limiting section 128. Thus, a maximum value of the mirrored current as the sending signal may be limited, and the voltage and/or the current applied to the sensing signal processing section 147 may be ultimately limited.

Accuracy of a mirroring operation by the first and third MOS transistors 101 and 103 may be increased by operations of the fifth MOS transistor 105 and the OP amplifier 126.

The normality determination block 600 may detect a falling edge or a rising edge or detect a low level or a high level according to output from the sensor input terminal unit 100, and may also detect and compare both of edges or levels when using a duplex method.

Meanwhile, the sensor input terminal unit 100 may perform a battery short detection function, a ground short detection function, a current limiting function, and a load open detection function, for protecting the circuit in the sensor input terminal unit 100.

The battery short detection function may serve to protect the circuit in the sensor input terminal unit 100 in such a way to detect that the sensor input terminal unit 100 is erroneously connected to the battery instead of the wheel speed sensor 700. In addition, it may be possible to protect the circuit in the sensor input terminal unit 100 by adding an OP amplifier detection circuit thereto. For example, when it is detected that battery is connected to the sensor input terminal unit 100, the circuit may be implemented such that the third MOS transistor 103 is opened.

The ground short detection function may serve to protect the circuit in the sensor input terminal unit 100 in such a way to detect that the sensor input terminal unit 100 is erroneously connected to the ground portion instead of the wheel speed sensor 700. In addition, it may be possible to protect the circuit in the sensor input terminal unit 100 by adding an OP amplifier detection circuit thereto. In this case, it may be possible to warn a user by sending this information through the normality determination block 600.

The current limiting function may serve to limit the current through the current limiting section 128 in such a way to detect that an overcurrent flows to the wheel speed sensor 700, so as to warn a user.

The load open detection function may serve to transmit open information of the wheel speed sensor 700 to the sensor input terminal unit 100 such that a signal causing malfunction is not transmitted to the normality determination block 600 even though the wheel speed sensor 700 is opened to the sensor input terminal unit 100, so as to warn a user.

Figure 2:
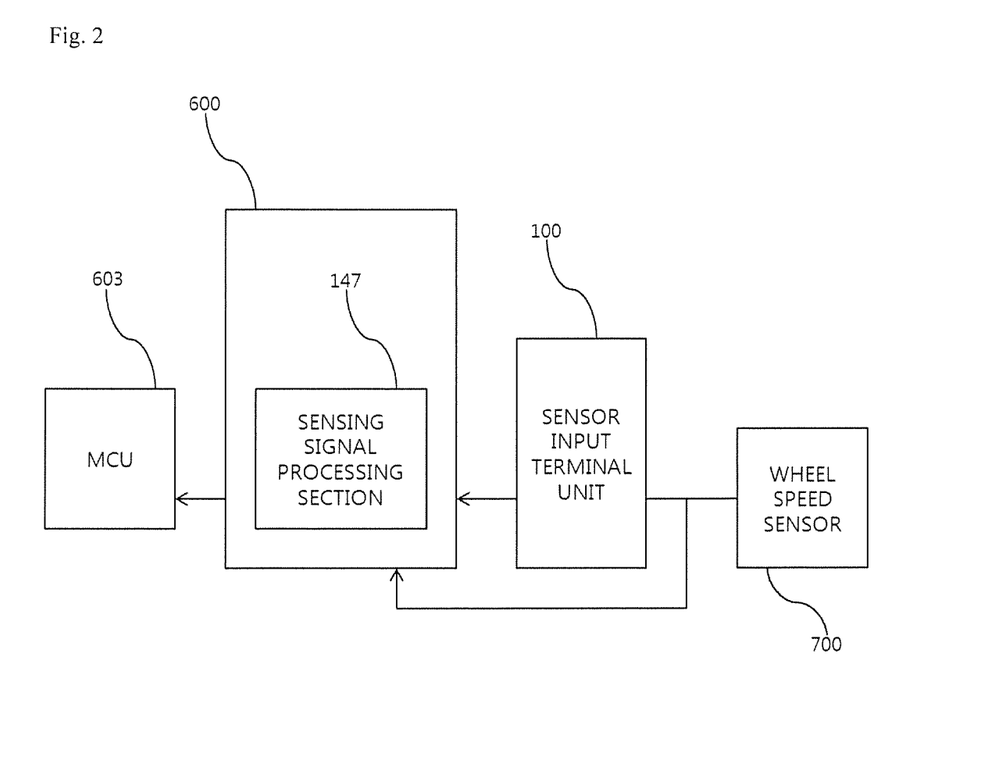
FIG. 2 is a circuit diagram illustrating an example in which a normality determination block in FIG. 1 is used as a sensing signal processing section.

FIG. 2 is a circuit diagram illustrating an example in which the normality determination block 600 in FIG. 1 is used as a sensing signal processing section 147. In this case, the normality determination block 600 may include the sensing signal processing section 147 which outputs a sensing signal to an external MCU 603.

That is, the sensing signal processing section 147 may perform various algorithms for a signal output from the sensor input terminal unit 100.

For example, the sensing signal processing section 147 may perform an interface so as to transmit the signal output from the sensor input terminal unit 100 to the MCU 603 as it is or may convert the signal into a high/low level signal required by the MCU 603 to transmit the converted signal to the MCU 603. In this case, the interface transmitted to the MCU 603 may be used in an analog or digital form.

Figure 3:
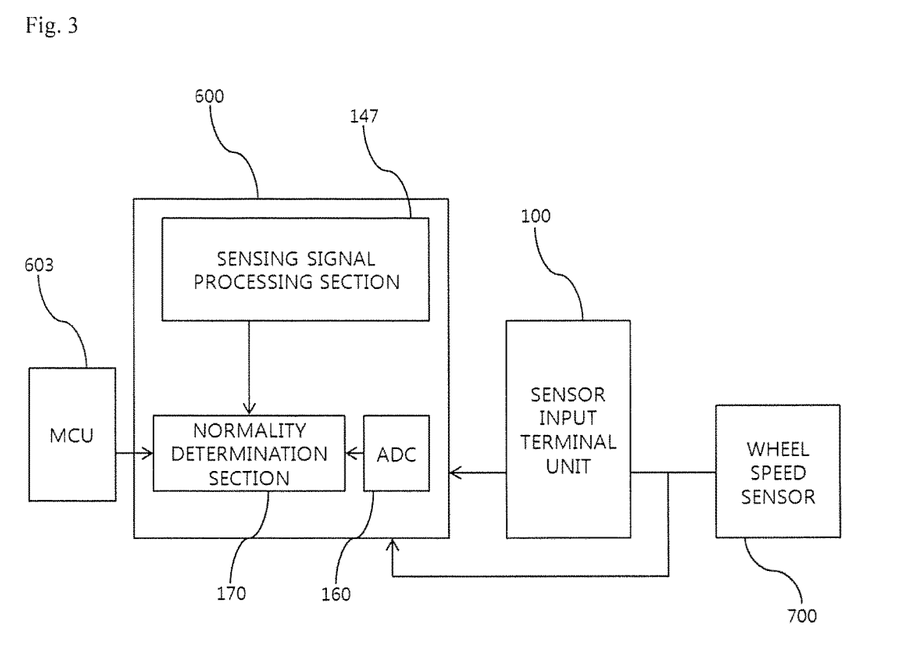
FIG. 3 is a circuit diagram illustrating an example in which the normality determination block in FIG. 1 is configured by a sensing signal processing section, an ADC, and a normality determination section.

FIG. 3 is a circuit diagram illustrating an example in which the normality determination block 600 in FIG. 1 is configured by a sensing signal processing section 147, an ADC 160, and a normality determination section 170. In this case, the normality determination block 600 may identify whether or not the sensing signal satisfies predetermined upper and lower limit current values.

Here, the normality determination block 600 may further include the sensing signal processing section 147 which has a falling/rising timing similar to the sensing signal and outputs a sensing voltage signal copied as a voltage signal having a high/low level required by the external MCU 603.

In addition, the normality determination block 600 may include the ADC 160 which converts the sensing signal transmitted from the sensor input terminal unit 100 into an analog-digital signal, and the normality determination section 170 which analyzes result values of the ADC 160 to determine a normal status thereof.

Here, the normality determination section 170 may analyze whether or not the sensor input terminal unit 100 is normally operated and the wheel speed sensor 700 is normally operated by comparing current values based on the output signal from the sensing signal processing section 147 and the output signal from the ADC 160.

Figure 4:
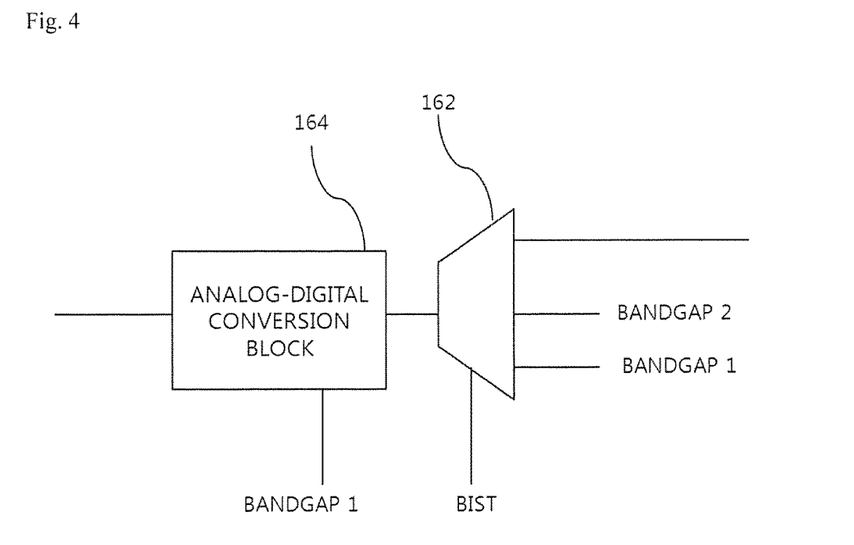
FIG. 4 is a block diagram illustrating the ADC in FIG. 3 in detail.

FIG. 4 is a block diagram illustrating the ADC 160 in FIG. 3 in detail. In this case, the ADC 160 may include a signal selection section 162 having a BIST (Built In Self Test) signal input terminal for instructing a BIST and at least one bandgap input terminal, and an analog-digital conversion block 164 which outputs a comparison result of levels of a predetermined reference threshold voltage and a voltage applied by the signal selection section 162 as a binary value.

The ADC 160 may further include the analog-digital conversion block 164 and the signal selection section 162 for implementation of the BIST.

Here, the signal selection section 162 may includes the BIST signal input terminal for instructing the BIST and two bandgap input terminals. One of a mirrored sensing signal input via the fifth MOS transistor 105 and a test signal for the BIST may be selected and transmitted to the analog-digital conversion block 164, according to the BIST signal status at the BIST signal input terminal of the signal selection section 162.

In addition, the signal selection section 162 receives a bandgap voltage as reference voltage, and may have a structure of comparing two input bandgap voltages as illustrated in the drawing in order to identify whether or not each bandgap voltage itself are abnormal. Alternatively, the signal selection section 162 may have an independent bandgap voltage generation circuit formed therein, and compare a voltage generated thereby and a bandgap voltage applied from the outside.

The analog-digital conversion block 164 may be implemented by the known various analog-digital conversion circuits.

For example, the analog-digital conversion block 164 may include an equal number of unit comparison circuits as the number of output bits in parallel, each of unit comparison circuits outputting a comparison result of levels of a predetermined reference threshold voltage and a voltage applied by the signal selection section as a binary value. The reference threshold voltages of the respective unit comparison circuits may have different levels.

In addition, the analog-digital conversion block 164 may be implemented by feedback and counting type analog-digital conversion circuits such as a sigma-delta converter and a double integral converter.

Figure 5:
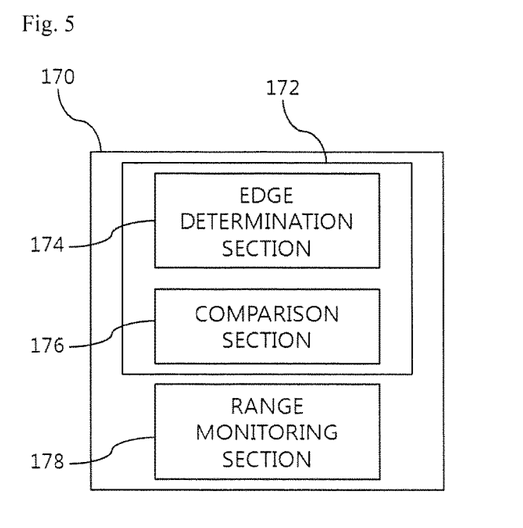
FIG. 5 is a block diagram illustrating the normality determination section in FIG. 3 in detail.

FIG. 5 is a block diagram illustrating the normality determination section 170 in FIG. 3 in detail. In this case, the normality determination section 170 may include an edge determination section 174 which determines a rising edge and a falling edge, a comparison section 176 which compares a high level range and a low level range, and a range monitoring section 178 which monitors whether or not the edge determination section 174 and the comparison section 176 are in a level range between upper and lower limit values.

That is, the range monitoring section 178 may be implemented by a circuit of determining whether an output value of the ADC 160 exceeds a predetermined upper limit value or is under a predetermined lower limit value. When the output value of the ADC 160 exceeds the predetermined upper limit value or is under the predetermined lower limit value, the range monitoring section 178 may inform the outside (for instance, a driver warning device, the MCU 603, or the like) of the above result.

In the embodiment, a comparison verification section 172 may receive a signal (copied sensing signal) copying the sensing signal output to the wheel speed sensor 700 from the sensing signal processing section 147, and may receive a current value or a voltage value which is digital-converted by the ADC 160.

In this case, the comparison verification section 172 may include the edge determination section 174 which determines the rising edge and the falling edge of the copied sensing signal received from the sending signal processing section 147.

In addition, the comparison section 176 of the comparison verification section 172 may determine whether the current or voltage value transmitted from the ADC 160 is in a predetermined high level value range, immediately after determination of the rising edge, and may determine whether the current or voltage value transmitted from the ADC 160 is in a predetermined low level value range, immediately after determination of the falling edge.

When the current or voltage value transmitted from the ADC 160 is not in the predetermined high level value range immediately after determination of the rising edge, the wheel speed sensor 700 or the signal processing apparatus for the wheel speed sensor 700 may be determined to be in an abnormal state.

When the current or voltage value transmitted from the ADC 160 is not in the predetermined low level value range immediately after determination of the falling edge, the wheel speed sensor 700 or the signal processing apparatus for the wheel speed sensor 700 may be determined to be in an abnormal state.

Although the illustrated normality determination section 170 is described as an inner block embedded in the signal processing apparatus for the wheel speed sensor 700, the normality determination section 170 may be configured of hardware independent from the signal processing apparatus.

Figure 6:
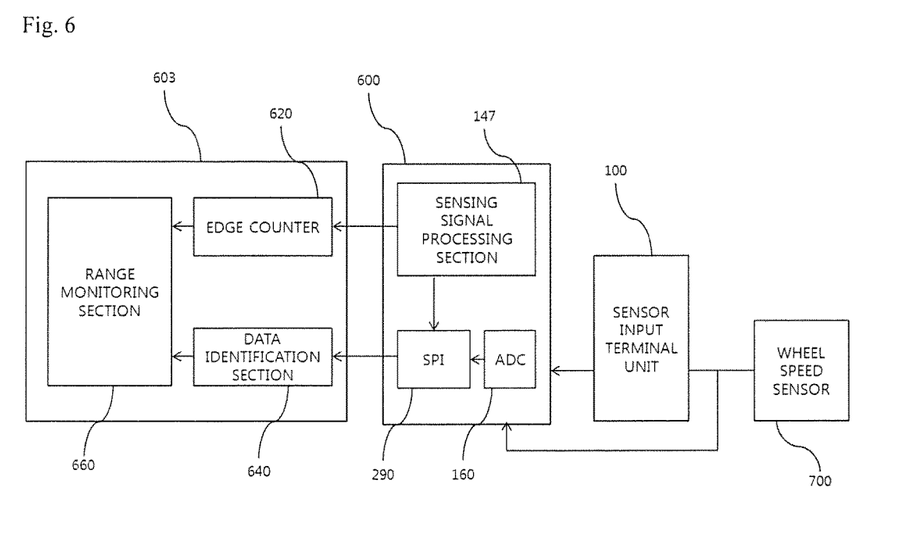
FIG. 6 is a circuit diagram illustrating an example in which the normality determination block in FIG. 1 is configured by an edge counter, a data identification section, and a comparison determination processing section and is determined by software in an MCU.

FIG. 6 is a circuit diagram illustrating an example in which the normality determination block 600 in FIG. 1 is configured by an edge counter 620, a data identification section 640, and a comparison determination processing section 660 and is determined by software in the MCU 603. In this case, the normality determination block 600 may include the edge counter 620 which determines and counts a rising edge and/or a falling edge of the sensing signal, the data identification section 640 which identifies a falling pattern and a rising pattern of the sensing signal, and the comparison determination processing section 660 which compares the number of counted edges output from the edge counter 620 and the number of patterns output from the data identification section 640 and determines a normal/abnormal status thereof.

The normality determination block 600 receives signals output from the sensing signal processing section 147 and the ADC 160, and determines a normal status thereof. The normality determination block 600 may be implemented as HW and/or SW independent from the signal processing block for the wheel speed sensor 700. In addition, the normality determination block 600 may be implemented as an inner module of an external processor such as the MCU 603.

That is, the signal processing apparatus for a wheel speed sensor in the embodiment may be configured of the normality determination block 600 and the signal processing block. Data communication between the normality determination block 600 and the signal processing block may be realized in a data communication form between separated chips. In the drawings, data is output to the normality determination block 600 from the sensing signal processing section 147 in an existing digital output form, and the normality determination block 600 may include an SPI (Serial Parallel Interface) 290 in order for signals to be output to the normality determination block 600 from the ADC 160 in a parallel data communication form.

The normality determination block 600 may include the edge counter 620 which determines and counts the rising edge and/or the falling edge of the copied sensing signal received from the sensing signal processing section 147, the data identification section 640 which identifies the falling pattern and the rising pattern from the signal transmitted from the ADC 160, and the comparison determination processing section 660 which compares the number of edges counted by the edge counter 620 and the number of patterns identified by the data identification section 640 and determines the normal/abnormal status thereof.

The edge counter 620 may have a structure similar to that having a processor for calculating a speed by receiving the signal of the wheel speed sensor 700. The data identification section 640 may analyze a digital signal stream transmitted from the ADC 160, identify a point at which a pattern of a falling edge and/or a rising edge is present, and count the same. The comparison determination section 660 may identify whether the number of counted falling edges and/or rising edges for analog signals of the edge counter 620 coincides with the number of counted falling patterns and/or rising patterns for digital signals of the data identification section 640. When the number of counted edges does not coincide with the number of counted patterns, the wheel speed sensor 700 or the signal processing apparatus for the wheel speed sensor 700 may be determined to be in an abnormal state.

Figure 7:
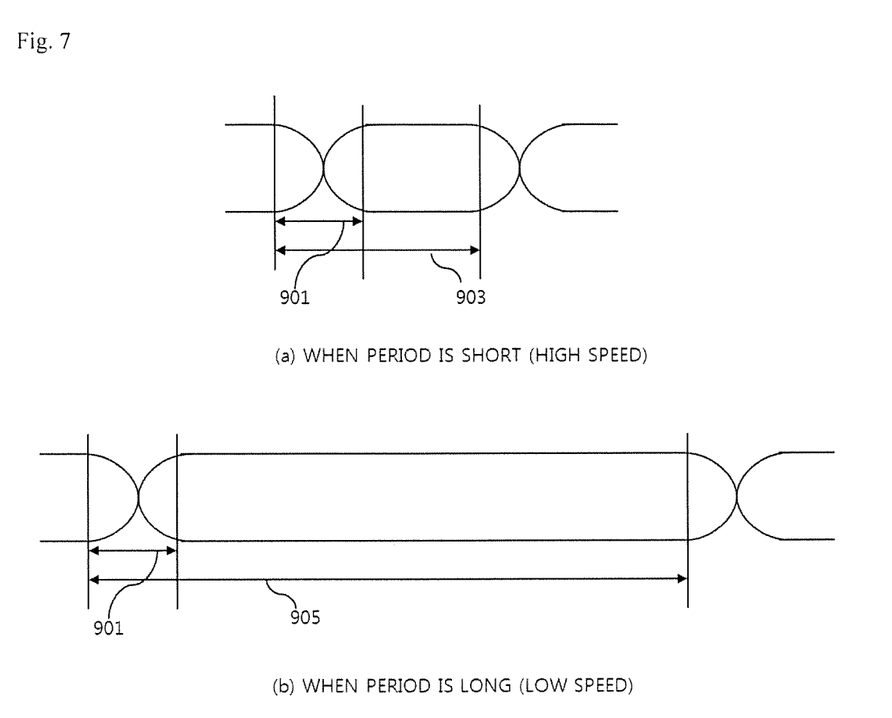
FIG. 7 is a timing chart illustrating a data analysis timing in the normality determination block in FIG. 1.

FIG. 7 is a timing chart illustrating a data analysis timing in the normality determination block 600 in FIG. 1. In this case, the normality determination block 600 may determine a difference between a level detection time of the rising edge or falling edge and a level detection time after detection of the rising edge or falling edge using at least one of a fixed timing synchronization algorithm, an adaptive timing synchronization algorithm, and a timing tracking circuit.

Meanwhile, the signals of the sensing signal processing section 147 and the ADC 160 may be delayed according to implementation of the circuit. Such a delay may cause an error in analyzing whether or not the sensor input terminal unit 100 and the wheel speed sensor 700 are normally operated.

Accordingly, sampling of the ACD 160 after detection of the edge by the sensing signal processing section 147 should be performed after the longest delayed time of a rising time and a falling time of the sensing signal processing section 147 and should be performed before generation of a next rising time or a next falling time due to vehicle speed, such that an error of the sampling may be reduced.

That is, a sampling period is between a minimum delay time 901 and a cycle 903 when the wheel is operated at high speed as illustrated in FIG. 7(*a*). Such a distance is relatively small compared with a sampling period which is between a minimum delay time 901 and a cycle 905 when the wheel is operated at low speed.

Therefore, it is necessary to design a circuit in view of the rotation speed of the wheel and the rising and falling times of the wheel speed sensor 700 and the sensor input terminal unit 100.

Meanwhile, the adaptive timing synchronization algorithm and the timing tracking circuit such as a COSTAS LOOP may also be used in addition to the method of setting the sampling delay of the ADC 160 based on the fixed rising and falling times.

The functions described in one or more exemplary embodiments may be implemented by hardware, software, firmware, or any combination of thereof. When the functions are implemented by the software, the functions may be stored in or transmitted to computer-readable recoding media as one or more commands or codes. The computer-readable recoding media may include all of communication media and computer storage media including any media for easily transferring computer programs from one place to another place.

The storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that may be used to carry or store desired program code in the form of instructions or data structures and that can be accessed by a computer. Also, any connection is properly termed a computer-readable medium.

In the implementation of software, technologies disclosed herein may be implemented by modules (for instance, procedures, functions, etc.) for performing the functions described herein. Software codes may be stored in memory units and executed by processors. The memory units may be implemented inside/outside the processors. In this case, the memory units may be connected to the processors to be communicated to each other by the well-known various means.

In the implementation of hardware, processing unite may be implemented or performed with one or more of an Application Specific Integrated Circuit (ASIC), a Digital Signal Processor (DSP), a Programmable Logic Device (PLD), a Field Programmable Gate Array (FPGA), a processor, a controller, a microcontroller, a microprocessor, and other electronic units designed to perform the functions described herein, or any combination thereof.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

Furthermore, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As described above, the signal processing apparatus for a wheel speed sensor according to the embodiment of the present invention has an advantage of monitoring the current input to the wheel speed sensor so as to prevent the current from being excessively supplied to the wheel speed sensor. In addition, the signal processing apparatus for a wheel speed sensor has an advantage of monitoring whether or not the wheel speed sensor is abnormally operated in real time and simultaneously identifying whether or not the monitoring circuit is abnormally operated, by monitoring the current input to the wheel speed sensor in a duplex manner.

As is apparent from the above description, a signal processing apparatus for a wheel speed sensor according to exemplary embodiments of the present invention has an advantage of monitoring a current input to a wheel speed sensor so as to prevent the current from being excessively supplied to the wheel speed sensor.

In addition, the signal processing apparatus for a wheel speed sensor according to the exemplary embodiments of the present invention has an advantage of monitoring whether or not the wheel speed sensor is abnormally operated in real time and simultaneously identifying whether or not a monitoring circuit is abnormally operated, by monitoring the current input to the wheel speed sensor in a duplex manner.

While the present invention has been described with respect to the specific embodiments, it will be apparent to those skilled in the art that various changes and modifications may be made without departing from the spirit and scope of the invention as defined in the following claims.

What is claimed is:

1. A signal processing apparatus for a wheel speed sensor, comprising:
   a sensor input terminal unit to which a sensing signal of a wheel speed sensor is input; and
   a normality determination block determining whether or not the sensing signal is normal,
   wherein the sensor input terminal unit protects a circuit therein by detecting that the wheel speed sensor is erroneously connected to a battery, and
   wherein the normality determination block determines a difference between a level detection time of a rising edge or a falling edge and a level detection time after detection of the rising edge or falling edge using at least one of a fixed timing synchronization algorithm, an adaptive timing synchronization algorithm, and a timing tracking circuit.

2. The signal processing apparatus according to claim 1, wherein the sensor input terminal unit protects the circuit therein by detecting that the wheel speed sensor is erroneously connected to a ground portion.

3. The signal processing apparatus according to claim 1, wherein the sensor input terminal unit protects the circuit therein by detecting that an overcurrent flows to the wheel speed sensor.

4. The signal processing apparatus according to claim 1, wherein the sensor input terminal unit detects that connection of the wheel speed sensor is opened and transmits open information to the normality determination block such that the normality determination block is not erroneously operated.

5. The signal processing apparatus according to claim 1, wherein the normality determination block comprises a sensing signal processing section which outputs the sensing signal to an external microcontroller (MCU).

6. The signal processing apparatus according to claim 1, wherein the normality determination block identifies whether the sensing signal satisfies a predetermined upper limit current value and a predetermined lower limit current value.

7. The signal processing apparatus according to claim 1, wherein the normality determination block further comprises a sensing signal processing section which has a falling/rising timing similar to the sensing signal and outputs a sensing voltage signal copied as a voltage signal having a high/low level required by an external MCU.

8. The signal processing apparatus according to claim 1, wherein the normality determination block comprises:
　an analog-to-digital converter (ADC) for converting the sensing signal transmitted from the sensor input terminal unit into an analog-digital signal; and
　a normality determination section for analyzing result values of the ADC to determine a normal status thereof.

9. The signal processing apparatus according to claim 8, wherein the ADC comprises:
　a signal selection section which has a Built In Self Test (BIST) signal input terminal for instructing a BIST and at least one bandgap input terminal; and
　an analog-digital conversion block which outputs a comparison result of levels of a predetermined reference threshold voltage and a voltage applied by the signal selection section as a binary value.

10. The signal processing apparatus according to claim 9, wherein the normality determination section comprises:
　an edge determination section which determines the rising edge and the falling edge;
　a comparison section which compares a high level range and a low level range; and
　a range monitoring section which monitors whether or not at least a level of the edge determination section and the comparison section is in a range between upper and lower limit values.

11. The signal processing apparatus according to claim 1, wherein the normality determination block comprises:
　an edge counter which determines and counts the rising edge and the falling edge of the sensing signal;
　a data identification section which identifies a falling pattern and a rising pattern of the sensing signal; and
　a comparison determination processing section which compares the number of counted edges output from the edge counter and the number of patterns output from the data identification section and determines a normal/abnormal status thereof.

* * * * *